(12) United States Patent
Kumazawa et al.

(10) Patent No.: US 6,726,977 B2
(45) Date of Patent: Apr. 27, 2004

(54) CORDIERITE HONEYCOMB STRUCTURE AND MANUFACTURING METHOD THEREOF

(75) Inventors: Kazuhiko Kumazawa, Hashima-gun (JP); Kunikazu Hamaguchi, Kasugai (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 10/168,082

(22) PCT Filed: Sep. 28, 2001

(86) PCT No.: PCT/JP01/08491

§ 371 (c)(1),
(2), (4) Date: Jun. 17, 2002

(87) PCT Pub. No.: WO02/30567

PCT Pub. Date: Apr. 18, 2002

(65) Prior Publication Data

US 2003/0026944 A1 Feb. 6, 2003

(51) Int. Cl.$^7$ ............................................. B32B 3/12
(52) U.S. Cl. ................. 428/116; 428/34.4; 55/523; 422/180; 422/222; 427/284; 427/287; 427/244; 427/443.2; 264/631; 264/340
(58) Field of Search ............................. 428/116, 117, 428/118, 34.4; 55/522, 523; 422/123, 168, 177, 180, 211, 222; 264/631, 629, 630, 340; 427/284, 287, 244, 430.1, 443.2

(56) References Cited

U.S. PATENT DOCUMENTS 5,629,067 A * 5/1997 Kotani et al.
5,846,276 A * 12/1998 Nagai et al.
6,242,072 B1   6/2001 Ueda et al.

FOREIGN PATENT DOCUMENTS

| DE | 199 25 391 A1 | 12/1999 |
| JP | 63-162028 | 7/1988 |
| JP | 2000-51710 | 2/2000 |
| JP | 2001-170492 | 6/2001 |

* cited by examiner

*Primary Examiner*—Deborah Jones
*Assistant Examiner*—Wendy Boss
(74) *Attorney, Agent, or Firm*—Parkhurst & Wendel, L.L.P.

(57) ABSTRACT

A honeycomb structure in which the structure has a reinforced part having been loaded with a cordierite powder at least on one end surface of the frontal openings of the substrate of a honeycomb structure made of cordierite. This honeycomb structure does not decrease merits of a small pressure loss and the like as a thin-walled honeycomb structure, and is also excellent in abrasive resistance of the end surfaces of the frontal openings.

6 Claims, No Drawings

CORDIERITE HONEYCOMB STRUCTURE AND MANUFACTURING METHOD THEREOF

TECHNICAL FIELD

The present invention relates to a cordierite honeycomb structure suitably used as a catalyst carrier for purifying automobile exhaust gas and a manufacturing method thereof.

BACKGROUND ART

Catalysts for purifying automobile exhaust gas are generally used in the form in which they are carried on a carrier. As a catalyst carrier of this kind has been utilized a honeycomb structure made of cordierite. In particular, emission gas control has become increasingly strict year by year, and thus, to keep up with the situation, i.e., to improve purification performance of the catalyst, a honeycomb structure with extremely thin partition wall as compared with conventional one has been proposed.

Thin-walled honeycomb structures, in which the wall thickness is 100 μm or less and the open frontal area of the end surfaces are 83% or more in some cases, have a variety of favorable characteristics as a catalyst carrier; for example, (1) the catalyst can be activated in an early stage after engine start-up because of a low heat capacity and a high warming-up efficiency, and (2) a pressure loss during passage of exhaust gas through the catalyst carrier can be lowered due to a high open frontal area, and so utilization thereof can be expected in the future.

However, a thin-walled honeycomb structure presents a problem, due to the above described structural characteristics, of serious abrasion of the end surfaces of the frontal openings exposed to exhaust gas of high pressure discharged from the engine. In particular, a catalyst (i.e., catalyst carrier) has lately come to be placed in the immediate vicinity of an engine for the purpose of improving throughput, which becomes a factor in accelerating the abrasion of the end surfaces of the frontal openings.

As measures for solving such a problem have been studied a method of thickening only the partition walls in the vicinity of the end surfaces of the frontal openings of a honeycomb structure (JP-A-2000-51710), a method of applying and firing a glass component such as a glaze or water glass on the end surfaces of the frontal openings of the substrate of a honeycomb structure, and a method of similarly applying and firing a specific component of cordierite-forming raw materials (ibid.) and the like.

However, the method of thickening the proximities of the end surfaces of the frontal openings is not preferable because it lowers the open frontal area of the end surfaces of a honeycomb structure, although improving the abrasive resistance of the end surfaces of the frontal openings, thereby decreasing the merit of a small pressure loss of a thin-walled honeycomb structure. In addition, the method of applying and firing a glass component such as a glaze did not successfully provide sufficient abrasive resistance since the applied part was vitrified and became rather brittle, although making the part compact and increasing strength thereof.

Furthermore, the method of applying and firing a specific component of cordierite-forming raw materials (referring to raw materials, such as a mixture of talc, alumina and kaolin, which become cordierite by heat treatment such as firing) is not preferable because it causes the chemical composition of the applied part to deviate from the stoichiometrical composition of cordierite leading to a high coefficient of thermal expansion, thereby losing thermal shock resistance, although allowing compacting of the part to proceed. In addition, the method only made compact the proximities of the end surfaces of the frontal openings and was insufficient from the viewpoint of abrasive resistance as well.

The present invention was made in view of the problem of the prior art described above and it is an object of the invention to provide a honeycomb structure that does not decrease the merits of a thin-walled honeycomb structure, such as a small pressure loss, and is also excellent in the abrasive resistance of the end surfaces of the frontal openings, and manufacturing method thereof.

DISCLOSURE OF THE INVENTION

The inventors have carried out intensive studies, and found that the problem of the prior art described above can be solved by forming a reinforced part having been loaded with a cordierite powder at least on one end surface of the frontal openings of the substrate of a honeycomb structure made of cordierite thereby completing the invention.

In other words, the present invention provides a cordierite honeycomb structure characterized in that the structure has a reinforced part having been loaded with a cordierite powder at least on one end surface of the frontal openings of the substrate of a honeycomb structure made of cordierite.

A cordierite honeycomb structure of the present invention preferably has a reinforced part with which a cordierite powder has been loaded through a glass phase.

A cordierite honeycomb structure of the present invention preferably has reinforced parts only in portions of the end surfaces of the frontal openings of the substrate and of 10 mm or less from the end surfaces of the frontal openings of the substrate towards the cell-forming direction and it is effective when the thickness of the partition wall of the substrate is 100 μm or less.

In addition, the present invention provides a manufacturing method of a cordierite honeycomb structure characterized in that the drying and/or firing are carried out after slurry containing a cordierite powder is applied to at least one end surface of the frontal openings of the fired or unfired substrate of a honeycomb structure, made of cordierite or a cordierite-forming raw material.

In a manufacturing method of the present invention, the drying and/or firing are preferably carried out after slurry containing a cordierite powder and colloidal ceramic is made to adhere to the structure and the drying and/or firing are preferably carried out after slurry containing a cordierite powder and glaze is made to adhere to the structure.

BEST MODE FOR CARRYING OUT THE INVENTION

A cordierite honeycomb structure of the present invention has a reinforced part having been loaded with a cordierite powder at least on one end surface of the frontal openings of the substrate of a honeycomb structure made of cordierite.

The present invention provides a honeycomb structure that does not decrease the merits of a thin-walled honeycomb structure, such as a small pressure loss, and is excellent in the abrasive resistance of the end surfaces of the frontal openings.

A cordierite honeycomb structure of the present invention will be now described in detail.

A cordierite honeycomb structure of the present invention (hereinafter simply referred to as a "honeycomb structure")

is characterized in that it has a reinforced part having been loaded with a cordierite powder. This reinforced part fills atmospheric pores of the wall surface of a cordierite honeycomb structure of which substrate is made of a cordierite powder and is fused through a firing step, and therefore it becomes compact and its porosity is lowered, compared with other parts. As a result, in addition to the improvement of the abrasive resistance of the part, the thermal shock resistance is not decreased because the reinforced part is loaded with a cordierite powder, which is also a material used for the substrate, and so the difference in coefficients of thermal expansion between the reinforced part and the substrate is small and the thermal shock resistance does not decrease.

A "cordierite powder" in this invention literally refers to a powder of cordierite ($2MgO.2Al_2O_3.5SiO_2$), the chemical composition is 48 to 54% by weight of $SiO_2$, 32 to 38% by weight of $Al_2O_3$ and 12 to 18% by weight of MgO, and its main crystalline phase is cordierite.

However, the effects of the present invention can not be attained, in the case that a material capable of being converted into cordierite by heat treatment after a "cordierite-forming raw material," as is disclosed in JP-A-2000-51710, is adhered to a substrate and then the resultant is fired. This is because the resultant can not be called as one having been loaded with a "cordierite powder". More specifically, the thickness of the partition walls of the adhered part is increased, which in turn only increases a pressure loss; as a result, no improvement in abrasive resistance is observed.

A "substrate" as used in the present invention refers to a honeycomb structure, a tubular structure having a large number of cells (penetrating pores) partitioned by a plurality of partition walls, and its whole shape, size, the number of cells and shape thereof, and the like are not particularly limited; however, the present invention is especially effective in a thin-walled honeycomb structure that exhibits a low abrasive resistance on the end surfaces of the frontal openings and has a partition wall thickness of 100 µm or less.

A "reinforced part" is possessed only on at least either one of the end surfaces of the frontal openings of the substrate and does not need to be possessed on both of the end surfaces of the frontal openings. Since only one end surface of the frontal openings is exposed to exhaust gas of high pressure placed towards the engine side, only the abrasive resistance of the part thereof needs to be improved. However, because of no need for consideration of the direction when placed, the reinforced part is preferably possessed on both end surfaces of the frontal openings.

The "reinforced part" is compact and its porosity is low compared with other parts, and therefore widely spread formation thereof is not preferable because the amount of catalyst carried is decreased. Accordingly, the reinforced part is preferably possessed on a minimum portion for effecting enhancement in abrasive resistance, i.e., only the whole end surfaces of the frontal openings of a honeycomb structure and only the part within 10 mm from the end surfaces towards the cell-forming direction.

"Loading" is used in the present invention refers to a state in which a cordierite powder is bound to the substrate in any form, and cordierite after having been loaded does not need to be a powder. For example, when a cordierite powder is loaded to the substrate by heat treatment, the part of a cordierite powder, depending on the temperature, sometimes becomes like glass to be fused to the substrate through a glass phase, or is completely fused to be integrated into the substrate. These states are all included in the "loading" in the present invention.

While a substrate that is manufactured by extrusion molding is generally used, when slurry is made to adhere thereto, the substrate may be made of cordierite or made of a cordierite-forming raw material, or the substrate may be fired one (hereinafter referred to as a "fired body") or unfired one (one only dried, not fired yet after extrusion molding; hereinafter referred to as a "dried body"). However, firing after loading is essential for a body made of a cordierite-forming raw material and a dried body.

A method of loading a cordierite powder is not particularly limited. The methods, for example, include a spray method, a coating method with a brush, and a method coating with a sponge or the like impregnated with a slurry. More particularly, a method in which a substrate is immersed in slurry containing a cordierite powder and after the slurry is applied thereto, the substrate is dried and/or fired (so called the dipping method) is preferable. This is because the dipping method is simple and can provide a homogeneous carried state.

When loading is conducted by the dipping method, it is preferable to prepare slurry using a cordierite powder with an average particle size of 10 µm or less as measured by the laser method, in order to stabilize the slurry to attain homogeneous loading.

Water, for example, can be used as a dispersing medium for slurry and the slurry concentration is not particularly limited. However, the concentration of solid matter is preferably about 10 to 60% by weight in order to prepare homogeneous slurry with few precipitates.

To the above described slurry may be, as necessary, added an additive such as a surfactant used to prepare normal slurry.

Furthermore, an additive for strengthening the binding between colloidal ceramic, glaze or the like, a cordierite powder and a substrate is preferably added.

"Colloidal ceramic" in this invention refers to a colloidal ceramic particle with an average particle size of 0.2 µm or less. Addition of this particle together with a cordierite powder to slurry is preferable because it permits homogeneous loading of a cordierite powder and drying or heat treatment such as firing evaporates the moisture of the colloidal matter to create a strong adhesive effect.

This method can improve the abrasive resistance, if the substrate is a fired body, only even by drying the substrate at a relatively low temperature of about 100 to 200° C. without firing after slurry is made to adhere.

Moreover, if the firing is carried out after increasing the temperature to about 1400° C., a temperature of the proximity of the melting point (1450° C.) of cordierite, part of a cordierite powder becomes like glass and is fused to and is strongly bound to the substrate through a glass phase; therefore, it is preferable from the viewpoint of further improving the abrasive resistance.

Although the kind of ceramic for the colloidal ceramic is not particularly restricted, colloidal silica and colloidal alumina, which are commercially available, are preferably used. The solid matter ratio of cordierite powder to colloidal ceramic is preferably from about 5:95 to 20:80 by weight, to avoid the effect of a large extent of contraction when the colloidal ceramic is crystallized or vitrified in the process of heat treatment.

A "glaze" in this invention refers to a formulation that forms glass of silicates after firing.

When this is added to slurry along with a cordierite powder, homogeneous loading of a cordierite powder becomes possible as in the case of colloidal ceramic. In addition, the agent lowers the melting point of a cordierite and thus the resultant is fused to the substrate relatively easily, or permits a cordierite powder to be melted and to be integrated into the substrate, thereby simply and easily leading to a strongly bound state.

Further, it is to be noted that a glaze, different from colloidal ceramic, is highly effective in adhesion only after it is fired and vitrified. That is, the effects of a glaze described above cannot be acquired simply by drying without firing.

Constituents constituting a glaze is not particularly restricted and a feldspar-based glaze with a vitrification temperature of 1250° C. or above is preferably used so as not to extremely lower the melting point of the substrate part to which the glaze adheres, and so a cordierite-based glaze in which about 30 to 40% by weight of cordierite is formulated in advance is further preferable in order to decrease the coefficient of thermal expansion of the glaze.

The cordierite-based glaze mentioned above can be prepared, for example, by wet grinding and mixing a cordierite powder to be carried in the substrate together with glaze raw materials of feldspar, silica, clay, etc. using a trommel.

In this case, a cordierite powder in the glaze is the same material as, but much finer than, a cordierite powder to be carried in the substrate, thereby constituting part of the vitrified constituent.

For the ratio between cordierite powder and glaze, as the amount of the glass constituent produced from the glaze is increased, the structure is liable to be brittle, thereby lowering the abrasive resistance. Accordingly, in a cordierite-based glaze, the ratio of cordierite powder to glaze is preferably about 1 to 1.

The substrate to which slurry is applied as mentioned above can form a reinforced part by drying and/or firing.

"Drying" here refers to an operation in which a dispersing medium in the slurry is removed at a relatively low temperature of about 100 to 200° C. and a cordierite powder and the like in the slurry are bound to the substrate. On the other hand, "firing" refers to an operation(s) in which a cordierite powder and the like in the slurry are sintered, fused, and melted and integrated into the substrate by heat treatment at a relatively high temperature of about 500 to 1400° C.

Specific examples of the practice of the present invention will be described in the following; however, the invention is not limited to these examples.

(1) Preparation of Sample

Examples and Comparative Examples demonstrate a honeycomb structure of a cylindrical shape 100 mm in diameter and 100 mm in length, having square cells at a density of 62 cells/cm$^2$, with the thickness of the partition walls being 90 μm and an open frontal area of 86%, using as the substrate a fired body made of cordierite or a dried body made of a cordierite-forming raw material.

Firstly, slurry having a composition indicated in Table 1, using water as dispersing medium, was prepared. To some of these slurry samples, was added a nonionic surfactant of 1% by weight relative to the total weight of slurry.

In the above described slurry samples was immersed only the part within 5 mm from the end surface of the frontal openings towards the cell-forming direction, of the above described substrates and then the substrates were pulled up. The substrates were then dried by ventilation at 150° C. to thereby remove the moisture and the like in the slurry. Furthermore, some of them were fired at 1400° C. to load a cordierite powder to the substrate; as a result, a honeycomb structure with a reinforced part was made (Examples 1 to 7 and Comparative Examples 1 to 7).

TABLE 1

| | | Slurry | | | | Abrasive resistance | CTE | | Porosity | Average pore size |
|---|---|---|---|---|---|---|---|---|---|---|
| | Carried constituent | Solid matter concentration (% by weight) | Surfactant | Substrate | Drying/ firing | (cm$^3$) | ($\times 10^{-6}$/° C.) | | (%) | (μm) |
| Untreated product | — | — | — | Fired body | — | 5.2 | 0.6 | T | 34 | 5 |
| Example 1 | Cordierite powder/ glaze (50:50) | 50 | Added | Fired body | Fired after dried | 1.9 | 0.9 | T | 24 | 8.2 |
| Example 2 | Cordierite powder/ glaze (50:50) | 50 | Added | Dried body | Fired after dried | 1.8 | 0.63 | T | 22 | 6.5 |
| Example 3 | Cordierite powder/ titanium oxide (90:10) | 50 | Added | Fired body | Fired after dried | 1.5 | 0.7 | T | 17 | 13 |
| Example 4 | Cordierite powder/ titanium oxide (90:10) | 50 | Added | Dried body | Fired after dried | 1.3 | 0.65 | T | 29 | 7 |
| Example 5 | Cordierite powder/ colloidal silica (90:10) | 50 | Added | Fired body | Fired after dried | 0.5 | 0.75 | T | 24 | 6.5 |
| Example 6 | Cordierite powder/ colloidal silica (90:10) | 50 | Added | Fired body | Dried only | 1.2 | 1.2 | ; | 29 | 3.5 |
| Example 7 | Cordierite powder | 50 | Added | Fired body | Fired after dried | 1.5 | 0.62 | T | 27 | 5.2 |
| Comparative Example 1 | Glaze | 50 | Added | Fired body | Fired after dried | 3.8 | 1.7 | x | 16 | 12 |
| Comparative Example 2 | Talc | 20 | Added | Fired body | Fired after dried | 2.5 | 0.75 | T | 31 | 7.6 |
| Comparative Example 3 | Talc | 20 | Added | Dried body | Fired after dried | 2.6 | 1.1 | ; | 29.5 | 9 |
| Comparative Example 4 | Alumina | 50 | Added | Fired body | Fired after dried | 4.5 | 1 | T | 25.5 | 6 |
| Comparative Example 5 | Titanium oxide | 50 | Added | Fired body | Fired after dried | Melted during firing | | | | |

TABLE 1-continued

| | | Slurry | | | | Abrasive | CTE | | Porosity | Average pore size |
|---|---|---|---|---|---|---|---|---|---|---|
| | Carried constituent | Solid matter concentration (% by weight) | Surfactant | Substrate | Drying/ firing | resistance (cm³) | (×10⁻⁶/° C.) | | (%) | (μm) |
| Comparative Example 6 | Colloidal silica | 30 | Not added | Fired body | Fired after dried | 3.5 | 1.6 | x | 20 | 12.5 |
| Comparative Example 7 | Colloidal silica | 30 | Not added | Fired body | Dried only | 4 | 1.4 | x | 27 | 6 |

(2) Evaluation Method

Honeycomb structure samples of Examples and Comparative Examples were measured for abrasive resistances, coefficients of thermal expansion, porosities and average pore sizes to evaluate performance thereof.

Abrasive resistance was evaluated by means of the volume of worn part of a sample after the following test was carried out.

First, to the exhaust port of a serial four-cylinder gasoline engine with a displacement of 2.2 liters was connected a metal case containing a sample of which reinforced part was directed towards the engine side. In other words, the sample was placed in the immediate vicinity of the engine. In this case, five iron balls with a diameter of 1.7 mm were put in the space between the reinforced part of the sample and the engine. This method can evaluate not only abrasive resistance for a level of oxidation generated in an actual operating circumstance, but variations in abrasive resistance in a short time.

In addition, the diameter of the iron ball was determined so that the ball does not pass through the square cell of the substrate.

An operation in which the engine was run at 6800 rpm for 5 minutes and then was warming-up run for 5 minutes was continuously repeated 300 times. The sample was taken out of the metal case and then the volume of the part worn by the iron balls, of the sample, was measured. The volume was simply evaluated by counting the number of beads with a diameter of 1.5 mm that were put in the worn part.

For the coefficient of thermal expansion (hereinafter referred to as the "CTE"), a coefficient of linear thermal expansion in the direction normal to the cell-forming direction of a sample was measured and evaluated. A sample of the value of $1.0 \times 10^{-6}/°$ C. or less was denoted by the mark T, for $1.2 \times 10^{-6}/°$ C. or less by the mark; and for above $1.2 \times 10^{-6}/°$ C. by the mark x.

A differential thermal dilatometer was used for measurement and the difference of the thermal expansion between a sample and a standard material at 40 to 800° C. was calculated for evaluation.

In addition, a portion of the reinforced part of a honeycomb structure in an Example or a Comparative Example was cut out and was measured by the mercury injection for the evaluation of porosity and the average pore size.

(3) Results

As is apparent from Table 1, for samples of Examples 1 to 7, in which a cordierite powder was carried, the volume of the worn part is each 40% by volume or less of the untreated product, indicating improvement in abrasive resistance. Furthermore, CTE's also all show good values of $1.2 \times 10^{-6}/°$ C. and less.

In particular, for the sample of Example 7, in which colloidal silica was added and firing was carried out, the volume of the worn part is 10% by volume or less of the untreated product, indicating a great improvement in abrasive resistance. The CTE thereof is rarely increased as well, showing an extremely good result.

On the other hand, for the samples of Comparative Examples 1 to 5, in which only constituents of lowering the melting point of cordierite were carried, the volume of the worn part, even in a small one, is about 50% of the untreated product, although the value of porosity is decreased and fining is observed, and so improvement in abrasive resistance is insufficient yet. In addition, the sample of Comparative Example 5 was melted due to too large a melting-point depression.

Further, for the samples except that of Comparative Example 2, in addition to a low improvement in abrasive resistance, the values of the CTE are extremely increased, suggesting low thermal shock resistances.

INDUSTRIAL APPLICABILITY

As was depicted thus far, a honeycomb structure of the present invention has a reinforced part having been loaded with a cordierite powder at least on one end surface of the frontal openings, does not decrease merits of a small pressure loss and the like as a thin-walled honeycomb structure, and is also excellent in abrasive resistance of the end surfaces of the frontal openings.

What is claimed is:

1. An open cordierite honeycomb structure having end surfaces of frontal openings with the openings forming cells extending in a cell-forming direction to a back end and the cells formed by partition walls characterized in that (1) the structure has a reinforced part having been uniformly loaded with a cordierite powder at least on one end surface of the frontal openings of the substrate of a honeycomb structure made of cordierite and (2) the reinforced part is one with which a cordierite powder has been loaded through a glass phase.

2. The cordierite honeycomb structure according to claim 1, characterized in that the structure has reinforced parts only in portions of the end surfaces of the frontal openings of the substrate and of 10 mm or less from the end surfaces of the frontal openings of the substrate towards the cell-forming direction.

3. The cordierite honeycomb structure according to claim 1, characterized in that the thickness of the partition wall of the substrate is 100 μm or less.

4. A method of manufacturing a cordierite honeycomb structure having (1) end surfaces of frontal openings and (2) a reinforced part with which a cordierite powder has been loaded through a glass phase, comprising extruding the substrate and then drying and/or firing the extruded substrate, characterized in that the drying and/or firing are carried out after a slurry containing a cordierite powder is applied by immersion to at least one end surface of the frontal openings of the fired or unfired substrate of a honeycomb structure, made of cordierite or a cordierite-forming raw material.

5. The method of manufacturing a cordierite honeycomb structure according to claim 4, characterized in that the drying and/or firing are carried out after slurry containing a cordierite powder and colloidal ceramic is applied to the structure.

6. The method of manufacturing a cordierite honeycomb structure according to claim 4, characterized in that the drying and firing are carried out after a slurry containing a cordierite powder and glaze is applied to the structure.

* * * * *